United States Patent [19]

Robertson

[11] Patent Number: 4,577,462
[45] Date of Patent: Mar. 25, 1986

[54] EXHAUST MIXING IN TURBOFAN AEROENGINES

[75] Inventor: John M. Robertson, Greenwich, Conn.

[73] Assignee: Rolls-Royce Limited, London, England

[21] Appl. No.: 665,152

[22] Filed: Oct. 26, 1984

[30] Foreign Application Priority Data

Nov. 8, 1983 [GB] United Kingdom ............... 8329733

[51] Int. Cl.$^4$ .............................................. F02K 1/02
[52] U.S. Cl. ....................................... 60/262; 60/263; 60/264; 60/271; 181/220; 239/265.17
[58] Field of Search ................................ 60/262–264, 60/226.1, 261; 239/265.17; 181/213, 220

[56] References Cited

U.S. PATENT DOCUMENTS

| 3,048,376 | 8/1962 | Howald et al. | 60/262 X |
| 4,175,640 | 11/1979 | Birch et al. | 60/262 X |
| 4,215,536 | 8/1980 | Rudolph | 60/262 |
| 4,227,370 | 10/1980 | Kirker | 60/264 X |
| 4,335,573 | 6/1982 | Wright | 60/262 X |
| 4,487,017 | 12/1984 | Rodgers | 60/264 X |

Primary Examiner—Carlton R. Croyle
Assistant Examiner—Jeffrey A. Simenauer
Attorney, Agent, or Firm—Cushman, Darby & Cushman

[57] ABSTRACT

The core engine of a mixed exhaust turbofan aeroengine is provided with a conical afterbody. The normal outlet guide vanes which remove residual swirl from the turbine exhaust gases are dispensed with and replaced by ducts within an afterbody having entries which receive the hot gases in the same manner and at the same angle as the passages between the guide vanes would have done. The hot ducts, whose aspect ratio is preferably transformed between their upstream and downstream ends, extend through the afterbody in substantially straight paths to avoid aerodynamic losses, and intersect its conical surface to form preferably slot-like nozzles from which the turbine exhaust gases issue as flattened jets. The exhaust jets partake of the original axial and tangential/swirl velocity components of the turbine gases, plus a radial component (consequential upon the orientation of the ducts) to achieve good penetration of the bypass stream. Satisfactory mixing between the bypass stream and the jets is achieved because of the radial and tangential velocity components and because the bypass stream flows in sheets between the jets. No net swirl in the mixed stream through the propulsion nozzle is ensured by counter-swirling of the bypass stream before mixing commences.

11 Claims, 3 Drawing Figures

EXHAUST MIXING IN TURBOFAN AEROENGINES

BACKGROUND OF THE INVENTION

The present invention relates to bypass gas turbine aeroengines, otherwise known as "turbofans", wherein the turbine exhaust gas stream and the bypass air stream are combined with each other before exit from a final propulsion nozzle, the combination of the two streams being facilitated by a "mixer" structure which divides the turbine exhaust stream into a plurality of discrete jets which penetrate and mix with the bypass air stream.

It is known that mixing of the bypass and turbine exhaust streams improves the propulsive efficiency of turbofans by transferring thermal energy from the hot turbine gases to the cooler bypass air. Even small improvements in the efficiency of the mixing process will significantly improve the propulsive efficiency of the turbofan, thereby allowing lower specific fuel consumption. So called "multi-lobed" and "multi-tubed" mixer nozzles, which project portions of the two streams into each other and increase the area of contact between them, have been used to improve the propulsive efficiency by improving the efficiency of the mixing process. During design of such mixer nozzles, the object is to maximise the contribution of the mixer to mixing efficiency whilst minimising mixer weight and the thrust losses inherent in the mixing process itself.

SHORT STATEMENT OF THE INVENTION

According to the present invention there is provided a bypass gas turbine aeroengine wherein, during operation of the aeroengine, a turbine exhaust stream, issuing from the engine core, and a bypass airstream issuing from the bypass duct surrounding the engine core, are combined with each other before exit of the combined stream from a final propulsion nozzle of the aeroengine, mixing of the two streams being facilitated by means whereby the turbine exhaust stream is divided into an annular array of discrete turbine exhaust jets, each such jet having: a rearward component of velocity; a radially outward component of velocity, whereby the jets penetrate into the surrounding bypass air stream and the bypass air stream flows in sheets between the jets; and a tangential component of velocity.

Preferably, the turbine exhaust jets are given cross-sections of elongate shape and are oriented so that the longitudinal centrelines of such cross-sections are substantially aligned with the direction of flow of the bypass stream therepast.

In spite of the tangential velocity components of the turbine exhaust jets, substantially zero net swirl velocity in the combined stream can be ensured by arranging that the bypass stream has a swirl component of velocity sufficient to balance the tangential momentum of the turbine exhaust jets. Note that a distinction between tangential and swirl components of velocity is maintained in order to distinguish respectively between the exhaust jets on the one hand and the turbine exhaust and bypass streams on the other.

In order to attain the desired components of velocity of the turbine exhaust jets, the invention proposes that the engine core is arranged to give the turbine exhaust stream within the engine core a resultant velocity comprising swirl and rearward components, a plurality of turbine exhaust ducts being provided to convey respective portions of the turbine exhaust stream from the engine core for production of the turbine exhaust jets, the turbine exhaust ducts being oriented and configured such that they accept and convey the turbine exhaust stream portions without substantial modification of the directions of flow thereof immediately before entry to said ducts, the swirl and rearward components of velocity of the turbine exhaust stream thereby becoming the tangential, radially outward and rearward components of velocity of the turbine exhaust jets.

Preferably, the turbine exhaust ducts are configured such that the turbine exhaust stream portions follow substantially straight paths between the inlets and outlets of the turbine exhaust ducts, the ducts preferably changing in cross-sectional shape between their inlets and outlets in order to produce turbine exhaust jets having cross-sections of a desired shape. The ducts extend through a rearwardly convergent (substantially conical) afterbody attached to the engine core and are preferably configured to act as diffusers for the turbine exhaust stream portions. Nozzles for the turbine exhaust jets are provided at locations where the turbine exhaust ducts intersect the surface of the afterbody.

The invention also includes an afterbody for the engine core of a bypass gas turbine aeroengine as described above.

BRIEF DESCRIPTION OF THE DRAWINGS

Embodiments of the invention will now be described by way of example only with reference to the accompanying drawings in which.

DETAILED DESCRIPTION OF THE PREFERRED EMBODIMENT

The drawings are not to scale.

Figure 1:
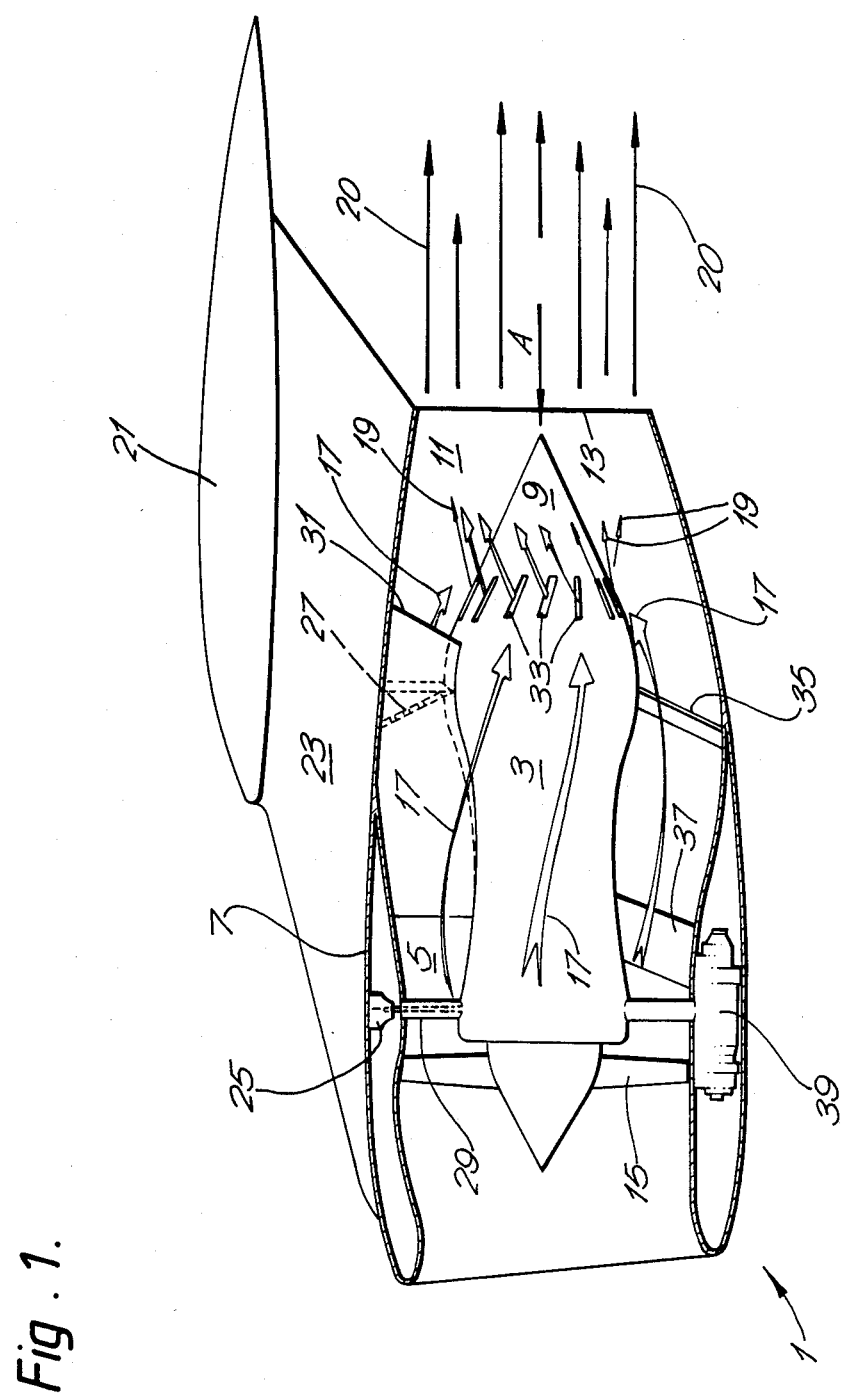
FIG. 1 shows a partly "cut away" side elevation in diagrammatic form of a turbofan aeroengine according to the invention.

Referring primarily to FIG. 1, a bypass gas turbine aeroengine or turbofan 1 has a high bypass ratio and has the following components: an engine core 3; a bypass duct 5 defined between the engine core 3 and the outer engine cowl 7; a conical afterbody 9 on the engine core 3; an exhaust mixing duct 11, and a final propulsion nozzle 13. The bypass duct 5 is supplied with bypass air from low pressure compressor or fan 15, which also supplies air to the engine core 3, the fan 15 being driven from the low pressure turbine 44 (FIG. 2) in the rear of core 3. The combination of the bypass air stream 17 with the hot exhaust stream 41 (FIG. 2) from the turbine is facilitated by the afterbody 9 which divides the turbine exhaust stream into an annular array of (e.g.) ten discrete jets 19 which diverge from each other as they penetrate the bypass stream 17 and mix with it, the bypass stream flowing in sheets between the jets. Mixing of the turbine exhaust gases with the bypass stream continues in the mixing duct 11 before exit of the combined stream 20 to atmosphere through propulsion nozzle 13. In order to absorb mixing noise as it arises, mixing duct 11 and afterbody 9 may be provided with acoustic facing panels as is known in the art.

Turbofan 1 is supported from the underside of a wing 21 of an aircraft (not shown) via a pylon 23, the engine core 3 being attached to structure (not shown) inside the external skin of pylon 23 via a suspension linkage 25 at the front and further suspension linkages 27 at the rear. Front suspension linkage 25 extends across bypass duct 5 within one of the fan outlet guide vanes 29, which remove some swirl velocity from the bypass stream 17 after it has been energised by the fan 15. Rear suspension linkages 27 extend across bypass duct 5 within a streamlined fairing 31, which occupies a sector of the bypass duct at its midlength, but which tapers to thin leading and trailing edges.

By the invention, the penetration of the turbine exhaust jets 19 into the bypass stream 17, and their combination by mixing, is facilitated by arranging that the jets 19, as they issue from slot-shaped nozzles 33 in conical afterbody 9, have both tangential and radial components of velocity in addition to their axial rearward velocity component, the directions of these velocities being relative to the centreline of the afterbody 9 and the propulsion nozzle 13. The radially outward components of velocity can be achieved without actively turning the turbine exhaust stream, even though it has only axial and swirl components of velocity within core 3. How this is achieved will be explained in relation to FIG. 2. The radially outward components and the tangential components of flow in jets 19 are both important to the efficiency of the mixing process, since the former ensure good penetration of the bypass stream by the turbine exhaust gases, and the latter ensure good vortical interactions between the flows.

As will be seen in FIG. 1, turbine exhaust jets 19 are shown as having a left hand tangential component of velocity (described in the conventional manner for screw threads) but in order to maximise the thrust of the turbofan 1, the combined stream 20 should flow through propulsion nozzle 13 in a substantially axial manner. Consequently, in order to balance out the tangential momentum of the turbine exhaust gases in jets 19, it is necessary to ensure that bypass stream 17, with which the turbine exhaust gases mix in mixing duct 11, has a right hand swirl component of velocity giving it a swirl momentum of substantially the same magnitude as the tangential momentum of the turbine exhaust gases, but of opposite effect. To achieve this state of affairs, the fan outlet guide vanes 29, which in a conventionally arranged turbofan act to straighten out the bypass stream as much as possible after it has been energised by the fan 15, are of such camber as to leave an appropriate residual swirl component of velocity in the bypass stream 17 as indicated by the arrows. For example, if the bypass ratio of turbofan 1 is 5:1, the swirl angle of the bypass stream must be approximately 1/5 of that of the turbine exhaust gases. Exact matching of swirl/tangential momenta between bypass stream 17 and turbine exhaust jets 19 will of course only be achieved at a certain engine running condition for which the entire mixing arrangement is designed, this usually being the "cruise" condition.

Note that in order to accommodate the swirling component of velocity in the bypass stream 17, the suspension fairing 31, as well as other structures extending across the bypass duct 5, such as strut 35 or fairing 37 for a shaft driving accessory components 39, must be appropriately configured and aligned within the duct.

Figure 2:
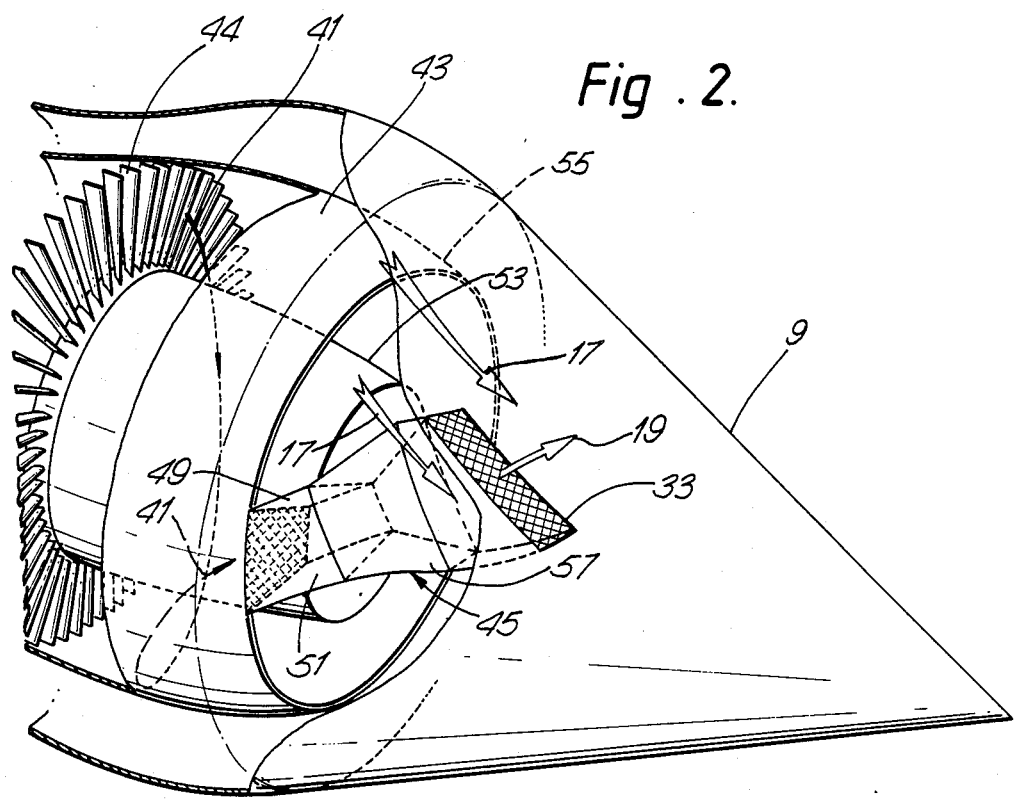
FIG. 2 is a "ghosted" perspective view showing detail in the rear of the engine core and its afterbody which is hidden in FIGS. 1 and 3, the rear of the engine core and its afterbody being shown in isolation from other structure.
Figure 3:
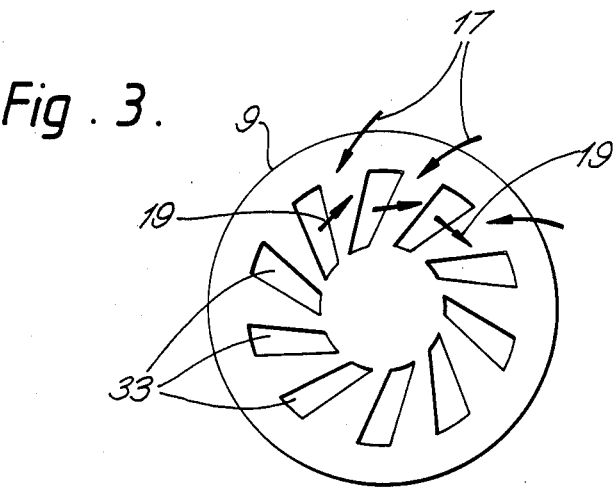
FIG. 3 is a view on arrow A in FIG. 1, showing the afterbody of the turbofan's engine core in isolation from other structures.

Turning now to a detailed consideration of FIGS. 2 and 3, we can consider the manner of production of the turbine exhaust jets by conical afterbody 9.

It is common in turbofan aeroengines for the gas stream leaving the last set of rotating turbine blades to have a swirl component of velocity about the engine centreline. This has advantages in the design of the turbine but in order not to lose propulsive thrust it is usual to remove this swirl by passing the gas through a set of stationary outlet guide vanes. Thus, referring to FIG. 2, the swirling turbine exhaust gas stream 41 which flows through the annular outlet duct 43 from turbine 44 would, in a conventional arrangement, be intercepted by such a set of outlet guide vanes whose leading edges would be correctly aligned to accept the swirling flow 41 with minimum disturbance to it, the vanes being cambered so as to remove the swirl component of velocity and leave only the axial component. It can be considered that such a set of outlet guide vanes would divide the turbine outlet duct 43 into a number of passages defined between the vanes, these separate passages terminating at the downstream edges of the vanes, and the separate exhaust gas flows through them being thus reunited. In the present embodiment of the invention, the passages between guide vanes are replaced by turbine exhaust ducts 45 which do not merge with each other to reunite the turbine gases into a further annular flow, but instead continue separately from each other through afterbody 9 until they intersect its conical surface to produce slot-shaped "nozzles" 33 from which turbine exhaust jets 19 issue. For convenience and simplicity of presentation, only one of these ducts 45 is shown in FIG. 2, though in fact there are ten of them arrayed around the afterbody 9 in this particular embodiment of the invention. The entrance and exit areas of the duct 45 are shown as cross-hatched.

Ducts 45 are formed from suitable heat resistant panels or plates. In FIG. 2, two of the most upstream plates are referenced as 49 and 51; the leading edges of these two plates extend radially between the inner wall 53 of turbine outlet duct 43 and its outer wall 55. In overall orientation, plates 49 and 51 are aligned to accept the swirling flow 41 with minimum disturbance to it in the same way as would the leading edges of the guide vanes which they replace. Note that although for reasons of clarity in FIG. 2, a considerable axial distance is shown between the turbine 44 and the downstream end of the turbine outlet duct 43, the swirling flow 41 downstream of the turbine would in fact pass into the ducts 45 within a very short axial distance to minimise aerodynamic losses and engine weight.

Once the swirling turbine exhaust stream 41 has been intercepted at the downstream end of turbine outlet duct 43 and separated into a number of discrete sub-streams by ducts 45, each such sub-stream is permitted to flow along a straight path so that at some distance along each duct, each sub-stream has components of velocity in the axial, tangential and radial directions, this being achieved without deflecting the sub-streams from their initial instantaneous overall directions of flow at the entrances to the passages. The flows in the passages 45 continue sensibly straight until the passages terminate at nozzles 33 in the surface of afterbody 9, the jets 19 issuing from the nozzles having the required components of velocity in the axial, tangential and radial directions.

Now from theoretical considerations it is believed that the most effective mixing between a bypass air stream and a turbine exhaust stream results from bringing the streams together in such a way that the hydraulic mean depth of the streams is small and the interface area between the streams is large—see, for example, the manner in which multilobed mixers attempt to bring the streams together in alternating "laminates". It is for this reason that the nozzles 33 are in the form of slots whose longitudinal dimensions are aligned so as to be substantially parallel with the direction of flow of the bypass stream 17 as it swirls over the outside of the conical afterbody in the direction shown by the arrows. The jets 19 from nozzles 33 are thus flattened and aligned with the direction of flow of the bypass stream 17, the bypass stream thereby also being divided into a number of substreams, or sheets, of shallow depth in the circumferential direction, which flow between the jets. It should be understood that because of the Coanda effect and the diffuser effect of the divergent annular duct formed between afterbody 9 and the outer cowling of the engine, the bypass stream tends to follow the convergent surface of the afterbody 9 instead of detaching itself therefrom, the convergence of the afterbody being sufficiently gradual to prevent detachment. An appreciation of the arrangement will be gained by viewing FIG. 2 in conjunction with FIG. 3, which shows all ten nozzle openings 33.

In order to produce the correct shape for nozzles 33, the turbine exhaust ducts 45 gradually change in shape between their upstream and downstream ends as indicated in FIG. 2, the ducts 45 being gradually flattened in transitional sections 57. In the present embodiment the ducts 45 transition from a height/width ratio of the order of one to a flattened section with a height/width ratio of the order of four.

Optimum performance of the mixing function in the above-described turbofan aeroengine will in practice depend upon detailed consideration of a number of thermodynamic and mechanical/structural factors in the design. For example, the operating pressure ratio between the bypass stream 17 and the turbine exhaust jets 19 will affect the degree of radial penetration through the bypass stream achieved by the hot jets 19; too little penetration will leave the outer portion of the bypass stream unmixed as it flows through the mixing duct 11, whilst too much penetration could cause unacceptably high temperature "hot-spots" on the wall of the mixing duct 11, with no additional mixing benefit compared with that achievable at acceptable wall temperatures. Note that adequate penetration produces adequate mixing within a shorter axial length of mixing duct 11, thereby allowing the length of mixing duct 11 to be minimised.

A further factor needing consideration will be the exact shape of nozzles 33 and their orientation with respect to the direction of flow of the bypass stream 17. For example, it could be advantageous to make the nozzles 33 (and hence the jets 19) somewhat wedge-shaped, with the thin ends of the wedges being their leading edges with respect to the direction of bypass flow, so that the "collision" between the bypass stream and the jets is of more gradual onset; or slot-shaped nozzles could be oriented somewhat out of alignment with the bypass flow to encourage extra turbulence if this were desireable for enhanced mixing.

Again, although the turbine exhaust ducts 45 are said above to be substantially straight, it would be possible to introduce a small curvature in the centre-line of the ducts to produce an enhanced radially outward velocity component in the jets 19, thereby possibly reducing the length required for mixing in mixing duct 11 and allowing the engine to be shortened. This would have to be a balance between internal drag losses introduced by curving the ducts 45, and weight saving with reduction of internal and external drag losses brought about by having a shorter mixing duct 11.

Aerodynamic tests show that the lower are the Mach numbers of the bypass and turbine exhaust streams as they start to mix, the lower are the aerodynamic losses due to mixing. Hence it is desirable to have the maximum possible amount of diffusion in the ducts 45 and in the pre-mixing portion of the mixing duct 11 through which the bypass stream is diffused after it leaves bypass duct 5. This also reduces the amount of diffusion required in the mixing duct 11 downstream of nozzles 33, and thereby allows its length to be minimised.

It should be noted that conical afterbody 9 will not experience direct impingement of any of the hot turbine exhaust gases and it can therefore be constructed of such materials as will stand the temperature of the combined stream in mixing duct 11, plus radiated and conducted heat from turbine exhaust ducts 45. Lightweight materials such as aluminium alloys or fibre-reinforced composites may therefore be adequate for this duty. Ducts 45 will of course experience the direct heating effects of the turbine exhaust gases and will need to be constructed of highly heat-resistant materials as already known to gas turbine engineers. However, hot ducts are inherently good structures from the point of view of vibration and stress, and it is further pointed out that ducts 45 offer an excellent opportunity for attenuating noise from the turbine by applying suitable sound attenuating acoustic linings to them.

Although in the above description it was stated that the bypass stream 17 partakes of a swirl component of velocity throughout the length of bypass duct 5, it will be appreciated that fan outlet guide vanes 29 could remove substantially all swirl from the bypass stream, it being reintroduced as necessary by a ring of guide vanes at the downstream end of bypass duct 5. This would eliminate the requirement for fairing structures in duct 5 to be skewed out of axial alignment to accommodate swirling flow.

I claim:

1. An improved exhaust mixing structure in a bypass gas turbine aeroengine, said aeroengine having an engine core surrounded by a bypass duct, wherein, during the operation of the aeroengine, a turbine exhaust stream is formed in the core of said engine having swirl and rearward components and a bypass airstream is formed in said bypass duct, said exhaust stream and bypass airstream being combined with each other before exit of the combined airstream from a final propulsion nozzle of said aeroengine, said exhaust mixing structure comprising:

means for dividing the turbine exhaust stream into an annular array of discrete turbine exhaust jets, each jet having (1) a rearward component of velocity, (2) a radially outward component of velocity, and (3) a tangential component of velocity, said means including a plurality of turbine exhaust ducts for conveying respective portions of the turbine exhaust stream from said engine core to thereby generate a plurality of turbine exhaust jets, said jets having an elongated shape in cross section and being oriented with the longitudinal centerlines of said cross-sections being substantially aligned with the direction of flow of said bypass stream airstream therepast, said ducts conveying said turbine exhaust stream into said bypass airstream without substantial modification to the direction of flow thereof immediately before entry of said exhaust stream into said ducts, the swirl and rearward components of velocity of the turbine exhaust streams thereby forming the tangential, radial and rearward components of velocity of said turbine exhaust jets, and means for imparting a swirl component of velocity to said bypass airstream sufficient to balance the tangential momentum of said turbine exhaust jets, said combined bypass airstream and turbine exhaust jets having a substantially zero net swirl velocity.

2. The improved exhaust mixing structure in a bypass gas turbine aeroengine of claim 1 wherein said turbine exhaust ducts are configured such that said turbine exhaust stream follows substantially straight paths between the inlets and outlets of the gas turbine exhaust ducts.

3. The improved exhaust mixing structure in a bypass gas turbine aeroengine of claim 1 wherein said turbine exhaust ducts change in cross-sectional shape between their inlets and outlets in order to produce turbine exhaust jets having a preselected cross-section.

4. The improved exhaust mixing structure in a bypass gas turbine aeroengine of claim 1 where said turbine exhaust ducts are configured to act as a diffuser for said turbine exhaust stream.

5. The improved exhaust mixing structure in a bypass gas turbine aeroengine of claim 1 wherein said engine core is provided with an afterbody.

6. The improved exhaust mixing structure in a bypass gas turbine aeroengine of claim 5 wherein said rearwardly convergent afterbody is substantially conical in shape.

7. An improved exhaust mixing structure in a bypass gas turbine aeroengine, said engine having an engine core surrounded by a bypass duct, wherein, during operation of the aeroengine, a turbine exhaust stream is formed in the core of said engine having a resultant velocity comprising swirl and rearward components, and a bypass stream is formed in said bypass duct surrounding said engine core, said exhaust stream and said bypass airstream being combined with each other before exit of the combined stream from a final propulsion nozzle of said aeroengine, said exhaust mixing structure comprising:

means for dividing the turbine exhaust stream into an annular array of discrete turbine exhaust jets, each jet having (1) a rearward component of velocity, (2) a radially outward component of velocity, and (3) and tangential component of velocity, said means including a plurality of turbine exhaust jets for conveying respective portions of the turbine exhaust stream from said engine core to thereby generate a plurality of turbine exhaust jets, said ducts having an elongated shape in cross-section and being oriented with the longitudinal centerlines of said cross-sections being substantially aligned with the direction of flow of said bypass airstream, said ducts conveying said turbine exhaust stream into said bypass airstream without substantial modification to the direction of flow thereof immediately before entry of said exhaust stream into said ducts, the swirl and rearward components of velocity of the turbine exhaust stream thereby forming the tangential, radial and rearward components of velocity of said turbine exhaust jets, said turbine exhaust ducts extending through a rearwardly convergent afterbody attached to the downstream end of said engine core, nozzles for said turbine exhaust jets being formed where said ducts intersect the surface of said afterbody; and means for imparting a swirl component of velocity to said bypass airstream sufficient to balance the tangential momentum of said turbine exhaust jets, said combined bypass airstream and turbine exhaust jets having a substantially zero net swirl velocity.

8. The improved exhaust mixing structure in a bypass gas turbine aeroengine of claim 7 wherein said turbine exhaust ducts are configured such that said turbine exhaust stream follows substantially straight paths between the inlets and outlets of the gas turbine exhaust ducts.

9. The improved exhaust mixing structure in a bypass gas turbine aeroengine of claim 7 wherein said turbine exhaust ducts change in cross-sectional shape between their inlets and outlets in order to produce turbine exhaust jets having a preselected cross-section.

10. The improved exhaust mixing structure in a bypass gas turbine aeroengine of claim 7 where said turbine exhaust ducts are configured to act as a diffuser for said turbine exhaust stream.

11. The improved exhaust mixing structure in a bypass gas turbine aeroengine of claim 7 wherein said rearwardly convergent afterbody is substantially conical in shape.

* * * * *